United States Patent [19]
Gross

[11] Patent Number: 4,712,966
[45] Date of Patent: Dec. 15, 1987

[54] MATERIAL HANDLING RACK WITH TRANSPORTATION MEANS

[75] Inventor: Peter L. Gross, Indianapolis, Ind.

[73] Assignee: Thomas L. Gross, Indianapolis, Ind.; a part interest

[21] Appl. No.: 796,106

[22] Filed: Nov. 8, 1985

[51] Int. Cl.⁴ .............................................. B60P 3/40
[52] U.S. Cl. .................... 414/458; 52/143; 108/55.3; 280/43.12; 296/43; 296/181; 403/346; 403/382; 414/495; 414/498
[58] Field of Search ............... 414/458, 459, 495, 498, 414/607, 608; 108/55.1, 55.3; 403/231, 346, 382, 403; 296/10, 32, 43, 181, 182; 280/43.12, 46; 180/19.1; 52/143, 578, 581

[56] References Cited

U.S. PATENT DOCUMENTS

| | | | |
|---|---|---|---|
| 2,785,818 | 3/1957 | Mercier et al. | 414/498 X |
| 3,143,358 | 8/1964 | Du Broff | 280/43.12 |
| 3,392,857 | 7/1968 | Tantlinger | 414/458 |
| 3,570,694 | 3/1971 | Tantlinger | 414/458 |
| 3,645,559 | 2/1972 | Stafford, Jr. | 414/495 X |
| 3,834,111 | 9/1974 | Acker et al. | 53/143 X |
| 3,986,317 | 10/1976 | Mountz | 403/231 X |
| 4,061,237 | 12/1977 | Austin et al. | 414/608 X |
| 4,286,913 | 9/1981 | Rowe et al. | 414/608 X |

FOREIGN PATENT DOCUMENTS 642253  1/1964  Belgium ................................ 414/608

Primary Examiner—Joseph E. Valenza
Assistant Examiner—David A. Bucci
Attorney, Agent, or Firm—Woodard, Emhardt, Naughton Moriarty & McNett

[57] ABSTRACT

A storage rack with moveable lifting jacks. The rack includes horizontally extending members joined but spaced apart by a pair of upper and a pair of lower cross members. Two upright posts extend above the horizontally extending support members and are secured in place by the cross members. A powered lifting jack and a follower lifting jack each include tongues insertable between the horizontally extending support members at the opposite ends of the rack. The tongues are biased between the upper and lower cross members preventing the pivotal motion of the tongues which are mounted to wheels rotatably mounted to frames having hydraulic cylinder motors mounted thereatop. Piston rods are extendable from the hydraulic cylinder motors and are attached to the tongues to apply lifting force in an upward direction along an axis extending through the wheel axis of rotation applying lifting force to the opposite ends of the rack.

2 Claims, 5 Drawing Figures

MATERIAL HANDLING RACK WITH TRANSPORTATION MEANS

BACKGROUND OF THE INVENTION

This invention is in the field of storage racks having means for the transportation thereof.

Description of the Prior Art

Forklifts are utilized to lift and move a variety of storage racks. Typically, the forklifts are very bulky and heavy in order to provide sufficient mass to counteract the mass of the object being lifted thereby requiring the forklift to be massive, expensive and not easily movable in confined quarters such as in a forest having tight and hilly paths and construction sites with uneven terrain.

A typical prior art lifting system is shown in FIG. 1 and includes a lifting tongue 20 moveably mounted along a vertical axis extending above wheels 21 with one end 22 of the tongue positionable beneath a storage rack whose weight is represented by vector W. A counter-weight is located on the forklift, or formed by the forklift, and exerts a downward force represented by vector C. In order for the prior art device shown in FIG. 1 to effectively operate, the moment represented by the vector W times distance $X_1$ must be less than the moment represented by the vector C times distance $X_2$. Lifting force F is directed upwardly against tongue 20 in order to lift the weight positioned atop the rack on the tongue. In the event that the moment generated by the weight W is greater than the moment generated by the counter-weight, then the forklift will tilt. This problem is solved by the invention disclosed herein allowing the mass of the lifting mechanism to be significantly reduced as compared with the prior art devices. In the prior art devices not all of the lifting force is applied directly to the task of lifting the weight stored upon the rack due to the pivoting of the lifting means or tongue 20. I have therefore designed a rack in combination with lifting means whereby the lifting means or tongue is prevented from pivoting resulting in elimination of the moment created by the large weight of the object being lifted. Thus, 100% of the lifting force is applied directly toward lifting weight W and the dead weight of the tongue. Therefore the mass and expense of the lifting means can be greatly reduced.

One end of my new rack with one such lifting means is shown in FIG. 2. Lifting means or tongue 28 is shown mounted to wheel 23 with one end 24 of the lifting means projecting into a mouth of rack 25 having a top edge 26 located atop tongue 28 between the outer end 24 and wheel 23 with the rack further having a bottom edge 27 located beneath the tongue immediately adjacent to the outer end 24. The lifting force F is applied in an upward direction to tongue 28 immediately over the axis of wheel 23. The moment normally caused by the weight R of the lifting means or tongue 22 and the weight W is neutralized since the tongue cannot pivot being positioned between edges 26 and 27. Thus, all of the lifting force F is directed to lifting the weight W upwardly along with the tongue dead weight when taken in combination with a similar lifting means located at the opposite end of the rack. In view of the design shown in FIG. 2, the tongue or lifting means may be designed with minimum strength, mass and side due to the elimination of the pivoting motion thereof along with the elimination of a strong lifting means and large counteracting mass for handling the moment associated with such pivoting motion. Thus the lifting means, unlike the prior art lifting means, may be utilized in confined spaces.

A number of U.S. patents have been granted on storage racks and lifting devices. U.S. Pat. No. 3,392,857 issued to Tantlinger discloses a pair of lifting means removably mountable to the opposite ends of a storage container. Likewise, U.S. Pat. No. 3,570,694 discloses wheeled lifting units releasably attached to the bottom corner sockets of a shipping container. It is also known to have lifting means which are self-propelled for pulling the storage rack such as shown in U.S. Pat. No. 4,277,079 issued to Propst, et al.

SUMMARY OF THE INVENTION

One embodiment of the present invention is a material handling rack with detachable wheels comprising a frame to hold material thereon and having a first end and a second end, a first carriage having supporting wheels rotatably mounted thereon with a single horizontal axis of rotation, a first tongue movably mounted to the carriage and insertable into the first end, a first vertical lifting means mounted to the carriage being operable to apply an upwardly directed lifting force to lift the tongue with the first end, a second carriage having supporting wheels rotatably mounted thereon with a sole horizontal axis of rotation, a second movable tongue movably mounted to the second carriage and insertable into the second end, a second vertical lifting means mounted to the second carriage being operable to apply an upwardly directed lifting force along a vertical axis extending through the sole horizontal axis to lift the second tongue with the second end, and, limit means on the frame at the first end and the second end limiting pivotal motion of the first tongue and the second tongue when inserted therein as the first vertical lifting means and the second lifting means lift the frame.

A further embodiment of the present invention is a storage lift comprising a frame to hold material thereon and having a first end, a first carriage having at least one supporting wheel rotatably mounted thereon, a first tongue movably mounted to the carriage and insertable into the first end, a first vertical lifting means mounted to the carriage being operable to apply lifting force to the tongue at a location over the wheel to lift the tongue with the first end, and, means on the frame at the first end limiting pivotal motion of the first tongue when inserted therein restricting torque applied to the first carriage by the frame as same is lifted.

Yet another embodiment of the present invention is a storage rack with lifting and moving means comprising a frame including opposite ends with a first mouth and a second mouth formed thereat, a prime mover with wheels rotatably mounted thereon and power means mounted thereon operably connected to the wheels to force the mover when connected to the frame across ground, the prime mover including a first tongue and first lifting means associated with the first tongue to lift the first tongue when inserted into the first mouth, a follower with wheels rotatably mounted thereon and including a second tongue, the follower including second lifting means thereon associated with the second tongue operable to lift the tongue when inserted into the mouth, and wherein the first mouth and the second mouth each including stop means therein contactable atop and beneath the first tongue and the second tongue to limit pivotal motion of each tongue as same is lifted with the frame thereon.

It is an object of the present invention to provide a new and improved material handling rack and associated transportation system.

A further object of the present invention is to provide a storage rack lifting means which applies the lifting force more efficiently to overcome the weight of the rack and stored material.

An additional object of the present invention is to provide a storage rack and lifting means combination whereby moments applied to the lifting means are minimized or are eliminated.

Related objects and advantages of the present invention will be apparent from the following description.

DESCRIPTION OF THE PREFERRED EMBODIMENT

Figure 2:
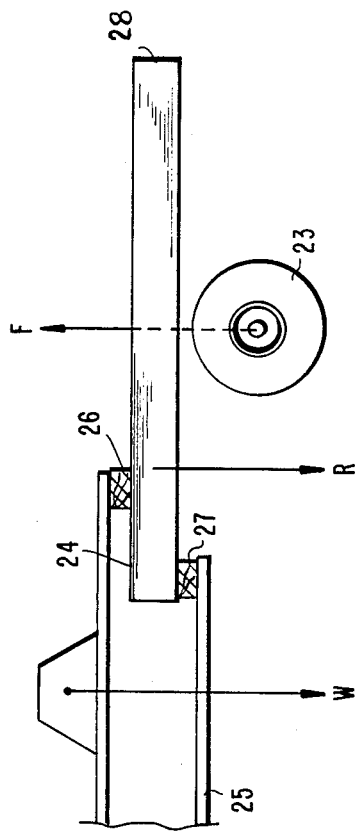
FIG. 2 is a fragmentary schematic view of my new and improved rack with lifting means.
Figure 1:
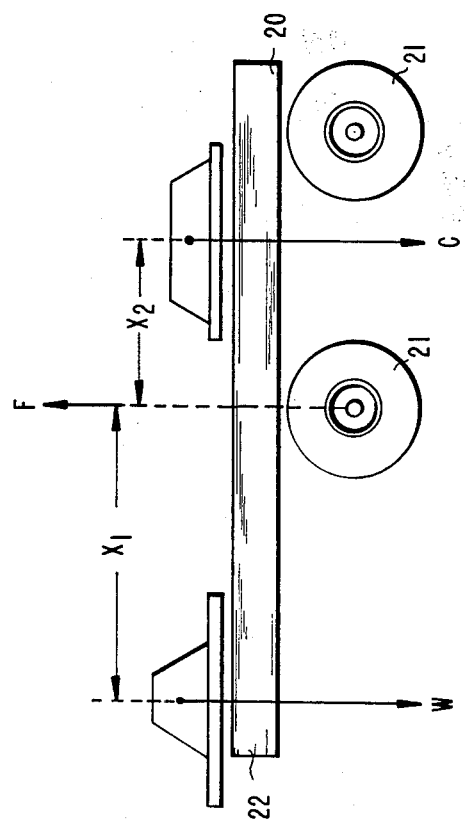
FIG. 1 is a schematic representation of the prior art lifting means and rack.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3:
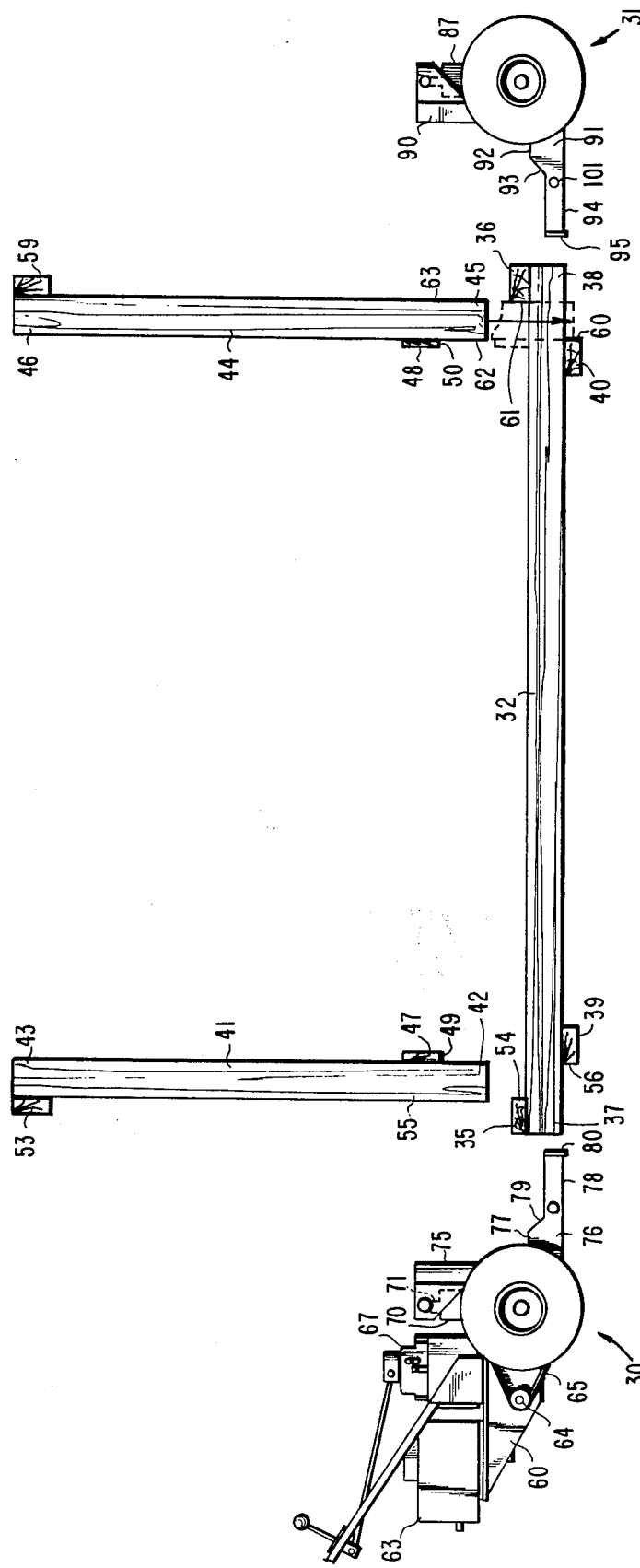
FIG. 3 is a side view of my new rack with associated lifting means.

Referring now more particularly to FIG. 3, there is shown a powered lifting jack 30 and a follower lifting jack 31 positioned at the opposite ends of storage rack 32 but not engaged therewith. Rack 32 includes a plurality of horizontally extending support member 33 and 34 (FIG. 4) upon which materials such as logs, blocks, bags, bricks, boxes, etc. may be stored. A pair of cross members 35 and 36 are fixedly secured atop and to the opposite ends 37 and 38 of members 33 and 34. Further, a pair of cross members 39 and 40 are fixedly secured to and beneath members 33 and 34 inwardly respectively of cross members 35 and 36.

Figure 4:
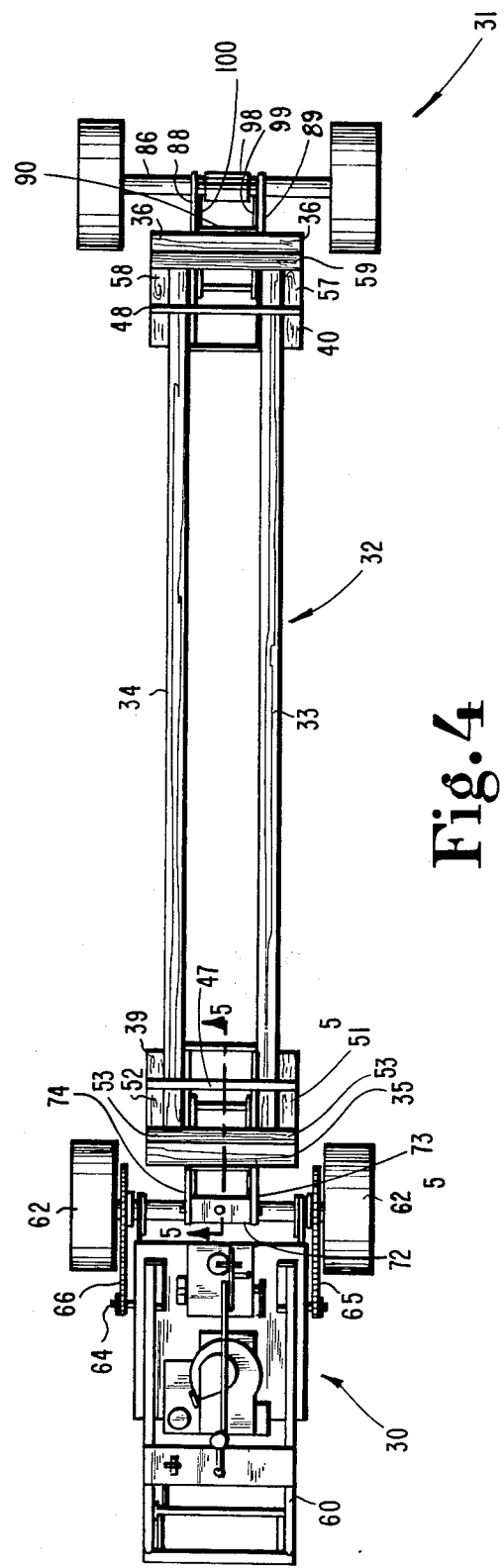
FIG. 4 is a top view of the rack and lifting means.

A pair of upright post assemblies 41 and 44 are mounted to the opposite ends 37 and 38 of rack 32 and are shown raised out of location in FIG. 3 for purposes of clarity. Upright post assembly 41 includes a pair of spaced-apart upright beams 51 and 52 secured together at their top ends by a cross member 53 with a second cross member 47 affixed to the lower bottom portions of beams 51 and 52. Beams 51 and 52 are spaced apart a sufficient distance to fit outwardly of support members 33 and 34 with the bottom surface 49 of cross member 47 resting atop support members 33 and 34 limiting downward movement of the upright post assembly 41. Cross members 35 and 39 also project outwardly to either side of support members 33 and 34 securing the upright post assembly in a vertical position. That is, cross member 35 includes a rearward surface 54 which contacts forward surface 55 of beams 51 and 52 whereas cross member 39 includes a forward surface 56 which contacts the rear surface of beams 51 and 52. When mounted in position such as shown in FIGS. 4 and 5, the bottom ends 42 of beams 51 and 52 are positioned at approximately the same elevation as cross member 39.

Upright post assembly 44 is mounted to end 38 in a manner identical to upright post assembly 41. That is, the rear upright post assembly 44 includes a pair of upright beams 57 and 58 secured together at their upper end 46 by cross member 59 with a second cross member 48 securing the beams together at their lower end portions 45. Beams 57 and 58 are spaced apart to fit outwardly of and to either side of support members 33 and 34 with the downwardly facing surface 50 of cross member 48 contacting the upper surface of support members 33 and 34 when the post assembly is mounted thereto. The rear surface 60 of cross member 40 and the front surface 61 of cross member 36 contact respectively the front surface 62 and rear surface 63 of beams 57 and 58 thereby holding the second upright post assembly in a vertical position. Material may therefore be stored upon the rack up to the top ends 43 and 46 of the upright post assemblies with the cross members 35, 39, 40 and 36 preventing the posts from pivoting outwardly under the force of the stored material. Post assemblies 41 and 44 may be pulled toward each other by any tension device (not shown) such as a cable, in order to insure material stored between the posts does not shift.

The front end 37 of rack 32 is removably secured to the rearwardly extending tongue of powered lifting jack 30 whereas the back end 38 of the rack is removably secured to the forwardly extending tongue of follower lifting jack 31. Jack 30 includes a main frame 60 pivotally mounted to a pair of wheels 62 about the axis of rotation of the two aligned wheels. A conventional gasoline engine 63 is mounted in conventional fashion on frame 60 and includes, via a transmission, differential and clutch, an output drive shaft 64 connected by drive chains 65 and 66 to a pair of sprockets attached to the wheels and axle mounting the wheels to frame 60. In such a manner, both wheels are positively driven to pull and/or push the rack in the desired direction. Suitable conventional controls are provided to control the speed and direction of travel. As such, a transmission and shift linkage assembly 67 is mounted on frame 60 and is operably disposed between the gasoline engine and drive shaft 64.

Figure 5:
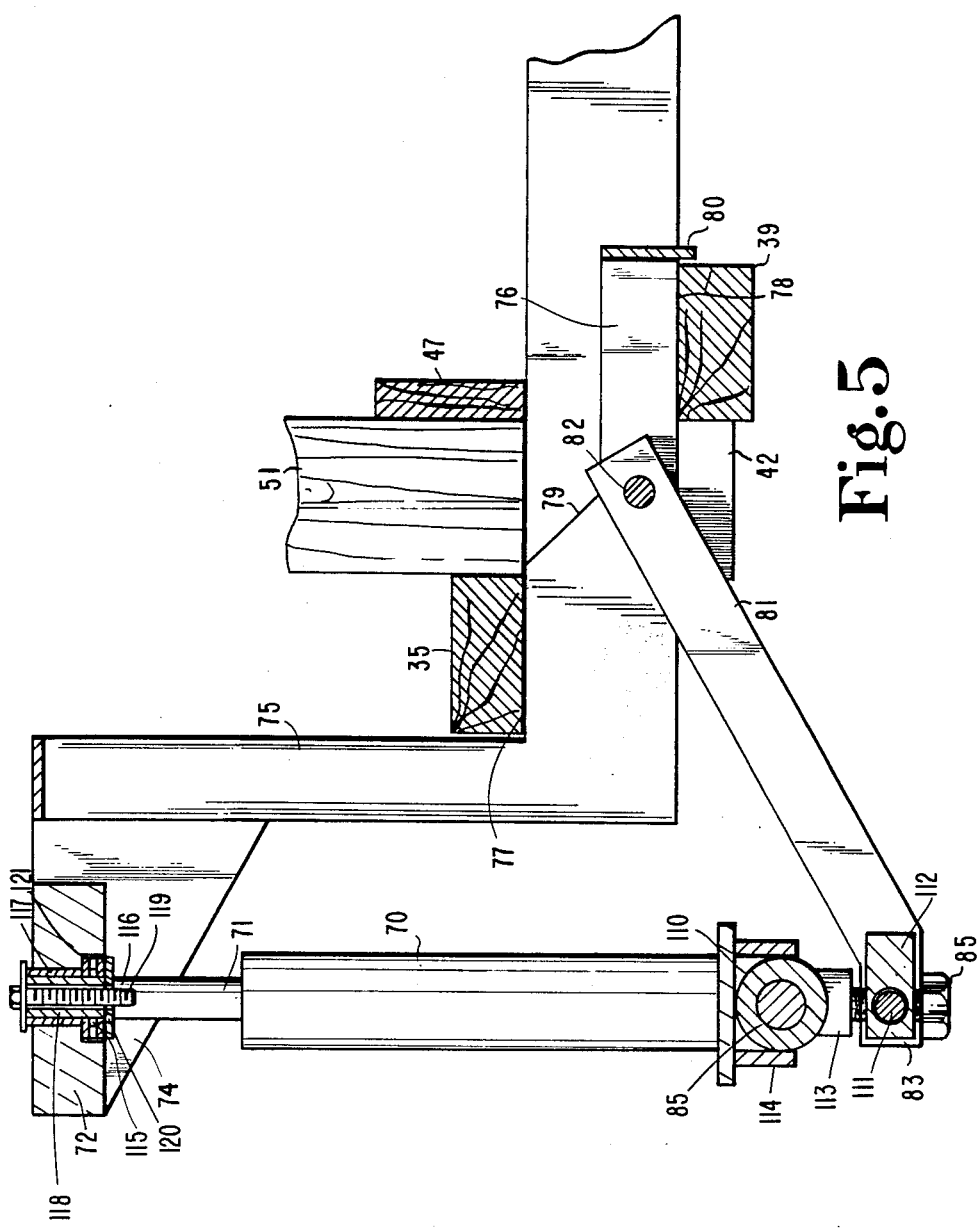
FIG. 5 is a fragmentary enlarged view of the left portion of the rack of FIG. 3 having the lifting tongue inserted therein.

A hydraulic lifting cylinder 70 is fixedly mounted on axle housing 110 by brackets 114 and has an upwardly extendable piston rod 71 pivotally mounted about an upwardly extending axis to plate 72 which is in turn pivotally mounted about a horizontal axis to a pair of spaced-apart flanges 73 and 74 (FIG. 4) fixedly secured to a downwardly extending wall 75 (FIG. 5). Wall 75 has a bottom end fixedly secured at right angles to rearwardly extending tongue 76. A conventional thrust bearing 115 and a conventional radial bearing 117 are positioned between the top end portion 116 of piston rod 71 and plate 72 allowing the plate to pivot about journal 118. Plate 72 is indented at location 121 to receive bearing 115 which sits atop thrust washer 120 positioned beneath plate 72 and on top of rod 71. Bolt 119 secures rod 71 to plate 72 with journal 118 spacing the head of bolt 119 apart from plate 72. Conventional fasteners and bearings pivotally mount plate 72 to and between flanges 73 and 74. This arrangement allows the flanges and tongue 76 to pivot about a horizontal and a vertical axis. Tongue 76 has a top surface 77 and a bottom surface 78 contacting respectively the downwardly facing surface of cross member 35 and the upwardly facing surface of cross member 39 when the tongue is inserted completely into the mouth of the rack formed by cross members 35 and 39. The width of tongue 76 is less than the spacing of support members 33 and 34 to allow the tongue to be inserted therebetween. Likewise, the height of the tongue is reduced by a downwardly extending edge 79 to facilitate the insertion of the tongue into the rack. An end plate 80 affixed to the distal end of the tongue projects slightly beneath the tongue forming a lip which hookingly engages cross member 39. Members 35 and 39 are spaced apart sufficiently to allow lip 80 to pass therebetween when the tongue is inserted. Once the tongue is inserted, cylinder 70 may be operated by extending piston rod 71 thereby forcing the tongue with rack in the upward direction. As the tongue is lifted, the tongue will cock slightly as a result of the vertical spacing of the cross members as compared to the vertical spacing of surface 77 to 78. The hydraulic cylinder motor 70 is conventional in design and may be operated either by a manually pivotable lever arm or by means of a separate motor.

In order to prevent the hydraulic cylinder and axle assembly from pivoting uncontrollably about the horizontal axis extending through plate 72, a pair of links are provided securing the tongue to the axle. The links have their distal ends pivotally mounted by pivot pin 82 to tongue 76 with the proximate ends pivotally secured about a horizontal axis by fasteners 111 to bar 112 which in turn is pivotally mounted about a vertical axis by fastener 85 to axle housing 110 surrounding axle 84 having the wheels mounted thereon. One such link 81 is shown in FIG. 5 and has one end pivotally mounted about a horizontal axis to the tongue by pin 82 with the opposite end 83 pivotally mounted about a second horizontal axis to bar 112 by pin 111. Bar 112 extends horizontally between the ends 83 of the pair of links. Each end 83 of the pair of links is pivotally mounted to an opposite end of bar 112. Bar 112 in turn is pivotally mounted about a vertical axis by a conventional fastener 85 and bearing to boss 113 affixed to axle housing 110. Thus, as the tongue is lifted upwardly, the links will rotate in a counter-clockwise direction as viewed in FIG. 5. As a result of the vertical pivotal mounting of bar 112 and plate 72, the entire tongue assembly is allowed to pivot around a vertical axis arranged perpendicular relative to the axis of rotation of wheels 62. Such vertical axis extends through piston rod 71 with the top end of the tongue assembly pivotally connected to the piston rod to pivot about such vertical axis which also extends through fastening device 85 with the proximate ends 83 of the links via block 112 and fastener 85 pivoting about the vertical axis. Thus, the powered lifting jack may be moved around a corner in an easier fashion due to the pivotal connection of the rack relative to the jack.

The follower lifting jack 31 is constructed in a manner similar to powered lifting jack 30 with the exception that a gasoline engine and transmission are not provided and with the further exception that the linkage connecting the tongue to the rear axle is not pivotable about a vertical axis. Thus, follower lifting jack 31 includes a pair of wheels rotatably mounted to an axle 86 having a conventional hydraulic cylinder motor 87 fixedly mounted thereon. The upwardly extendable piston rod of hydraulic cylinder motor 87 is fixedly connected to plate 98 pivotally mounted about a horizontal axis to flanges 88 and 89, in turn fixedly mounted to a downwardly extending wall 90 joined at right angles to forwardly extending tongue 91. The tongue has a width less than the spacing of support members 33 and 34 to allow the tongue to be inserted therebetween. The upper surface 92 of the tongue fits beneath and against the downwardly facing surface of cross member 36 whereas the bottom surface 94 of the tongue fits atop and is in contact with the upward facing surface of cross member 40. The tongue height is reduced at location 93 to facilitate insertion. A flange 95 at the distal end of the tongue forms a lip which hookingly engages cross member 40. The hydraulic cylinder motor 87 includes conventional controls such as a manually operated lever or a motor to activate in the control of the raising and lowering of the piston rod. Follower lifting jack 31 includes a linkage consisting of links 99 and 100 having distal ends pivotally mounted by pin 101 to tongue 91 and proximate ends fixedly secured by welding or other suitable means to the axle housing surrounding axle 86. Links 99 and 100 do not pivot about a vertical axis.

Many advantages of the present invention will be apparent from the above description. Specifically, by applying lifting force through and in the direction of an upwardly extending axis which extends centrally through the hydraulic cylinder motor and in turn intersects the rotational axis of the wheels, surfaces 77 and 92 (FIG. 3) are forced against the rack which in turn forces surfaces 78 and 94 against the top surfaces of cross members 39 and 40. As such, rotation of the tongue is prevented.

Another particular advantage resulting from the decreased weight and bulkiness of the rack and lifting system disclosed herein as compared with the prior art devices is the ability to maneuver same in a confined area such as a forest. Thus, the lifting jacks with rack attached may be moved into a forest or construction site, cut lumber stored upon the rack and then the rack pulled from the forest or site by the powered lifting jack 30. The rack with wood thereatop may then be transported directly to the user atop a conventional truck with the rack then being pulled from the truck to the user's home by the powered lifting jack. The rack may then be left at the home with the lifting jacks removed and utilized with another load. Once the wood is burned, the rack may be returned to the forest for another load. In such a manner, the prior method of loading the logs onto a rack, pulling the rack to a truck, unloading the logs from the rack onto the truck, transporting the truck to the home with the subsequent unloading of the logs from the truck onto a rack may be completely eliminated simply by loading the logs only one time onto a rack which is then transported and left at the end user's site. As a result, the amount of labor required to transport the logs from the forest to the end user's site is considerably reduced.

There are many other comparable users for the storage rack, such as the movement of cement, bricks, sod, boxes, etc. from factory to end user eliminating the need for many types of expensive handling and moving equipment.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A material handling rack with detachable wheels comprising:

a frame to hold material thereon and having a first end and a second end;

a first carriage having supporting wheels rotatably mounted thereon with a single horizontal axis of rotation, a first tongue movably mounted to said first carriage and insertable into said first end, a first vertical lifting means mounted to said first carriage being operable to apply an upwardly directed lifting force to lift said tongue with said first end:

a second carriage having supporting wheels rotatably mounted thereon with a sole horizontal axis of rotation, a second movable tongue movably mounted to said second carriage and insertable into said second end, a second vertical lifting means mounted to said second carriage being operable to apply an upwardly directed lifting force to lift said second tongue with said second end; and, limit means on said frame at said first end and said second end limiting pivotal motion of said first tongue and said second tongue when inserted therein as said first vertical lifting means and said second lifting means lift said frame;

said first tongue and said second tongue are positioned and extend respectively laterally away from said single horizontal axis and said sole horizontal axis with each extending in mutually facing directions into said frame;

said limit means at said first end of said frame includes a first inner support and a first outer support vertically and horizontally spaced apart forming a first mouth;

said first tongue is insertable into said first mouth and includes a first proximate portion and a first distal portion with said first distal portion bearing downwardly against said first inner support and said first proximate portion bearing upwardly against said first outer support as said first tongue is lifted upwardly limiting pivotal motion of said first tongue;

said limit means at said second end of said frame includes a second inner support and a second outer support vertically and horizontally spaced apart forming a second mouth;

said second tongue is insertable into said second mouth and includes a second proximate portion and a second distal portion with said second distal portion bearing downwardly against said second inner support and said second proximate portion bearing upwardly against said second outer support as said second tongue is lifted upwardly limiting pivotal motion of said second tongue;

power means on said first carriage being operable to move said frame with said first carriage and said second carriage connected across ground;

said frame includes horizontally extending spaced apart members connected together and upon which material may be supported, said first outer support and said second outer support are cross members affixed to and positioned atop said horizontally extending members with said cross members including downwardly facing surfaces contactable against said first tongue and second tongue as said frame is lifted, said first inner support and said second inner support are cross members affixed to and positioned beneath said horizontally extending members inwardly of said first outer support and said second outer support and include upwardly facing surfaces contactable against said first tongue and said second tongue as said frame is lifted, said downwardly facing surfaces are spaced apart vertically and horizontally from said upwardly facing surfaces and cooperatively therewith limit pivotal motion of said first tongue and said second tongue as said frame is lifted, said horizontally extending members with said first outer support, said second outer support, said first inner support and said second inner support cooperatively form two horizontally extending mouths opening in opposite directions to receive said first tongue and second tongue, said first carriage and said second carriage applying lifting force via said first lifting means and said second lifting means to said frame only at said first outer support and at said second outer support and contacting said frame only at said first outer support, said second outer support, said first inner support, and said second inner support;

said frame includes a first upright member removably mountable to said horizontally extending members between said first inner support and said first outer support and further includes a second upright member removably mountable to said horizontally extending members between said second inner support and said second outer support and cooperatively with said first upright member limiting movement of material resting upon said frame, said first upright member and said second upright member are vertically slidable into said mouths respectively between said first outer support and said first inner support and between said second outer support and said second inner support and extend perpendicularly therefrom, said first inner support and said first outer support have mutually facing vertical surfaces contacting said first upright member limiting movement thereof, said second inner support and said second outer support have mutually facing vertical surfaces contacting said second upright member limiting movement thereof, said first upright member and said second upright member each have a horizontally extending stop surface contacting said horizontally extending members limiting downward movement of said first upright member and said second upright member.

2. A material handling rack with detachable wheels comprising:

a frame to hold material thereon and having a first end and a second end;

a first carriage having supporting wheels rotatably mounted thereon with a single horizontal axis of rotation, a first tongue movably mounted to said carriage and insertable into said first end, a first vertical lifting means mounted to said carriage being operable to apply an upwardly directed lifting force to lift said tongue with said first end;

a second carriage having supporting wheels rotatably mounted thereon with a sole horizontal axis of rotation, a second movable tongue movably mounted to said second carriage and insertable into said second end, a second vertical lifting means mounted to said second carriage being operable to apply an upwardly directed lifting force to lift said second tongue with said second end; and, limit means on said frame at said first end and said second end limiting pivotal motion of said first tongue and said second tongue when inserted therein as said first vertical lifting means and second second vertical lifting means lift said frame;

said first tongue and said second tongue are positioned and extend respectively laterally away from said single horizontal axis and said sole horizontal axis with each extending in mutually facing directions into said frame;

said limit means at said first end of said frame includes a first inner support and a first outer support vertically and horizontally spaced apart forming a first mouth;

said first tongue is insertable into said first mouth and includes a first proximate portion and a first distal portion with said first distal portion bearing downwardly against said first inner support and said first proximate portion bearing upwardly against said first outer support as said first tongue is lifted upwardly limiting pivotal motion of said first tongue;

said limit means at said second end of said frame includes a second inner support and a second outer support vertically and horizontally spaced apart forming a second mouth;

said second tongue is insertable into said second mouth and includes a second proximate portion and a second distal portion with said second distal portion bearing downwardly against said second inner support and said second proximate portion bearing upwardly against said second outer support as said second tongue is lifted upwardly limiting pivotal motion of said second tongue;

power means on said first carriage being operable to move said frame with said first carriage and said second carriage connected across ground;

said frame includes horizontally extending members connected together and upon which material may be supported, said first outer support and said second outer support are cross members affixed to said horizontally extending members with said cross members including downwardly facing surfaces contactable against said first tongue and said second tongue as said frame is lifted, said first inner support and said second inner support are cross members affixed to said horizontally extending members inwardly of said first outer support and said second outer support and include upwardly facing surfaces contactable against said first tongue and said second tongue as said frame is lifted, said downwardly facing surfaces are spaced apart vertically and horizontally from said upwardly facing surfaces and cooperatively therewith limit pivotal motion of said first tongue and said second tongue as said frame is lifted;

said frame includes a first upright member removably mountable to said horizontally extending members between said first inner support and said first outer support and further includes a second upright member removably mountable to said horizontally extending members between said second inner support and said second outer support and cooperatively with said first upright member limiting movement of material resting upon said frame;

said first distal portion and said second distal portion have less height relative to said first proximate portion and said second proximate portion to facilitate insertion of said first tongue and said second tongue respectively into said first mouth and said second mouth;

said first vertical lifting means and said second vertical lifting means include hydraulic power cylinders connected respectively to said first tongue and second tongue respectively over said single horizontal axis and said sole horizontal axis, said first carriage includes an axle with said first vertical lifting means mounted thereatop and further include a stability link pivotally connected to and between said axle and said first tongue limiting movement of said first tongue, said first vertical lifting means operable to apply an upwardly directed lifting force along an upwardly extending axis which extends through said single horizontal axis to lift said tongue with said first end, said second vertical lifting means operable to apply an upwardly directed lifting force along an upwardly extending axis which extends through said sole horizontal axis to lift said second tongue with said second end.

* * * * *